United States Patent
Engber et al.

(10) Patent No.: US 9,787,235 B2
(45) Date of Patent: Oct. 10, 2017

(54) METHOD AND DEVICE FOR OPERATING A GENERATOR

(75) Inventors: Arnold Engber, Hoesbach (DE); Thomas Koss, Reutlingen (DE)

(73) Assignee: ROBERT BOSCH GMBH, Stuttgart (DE)

(*) Notice: Subject to any disclaimer, the term of this patent is extended or adjusted under 35 U.S.C. 154(b) by 768 days.

(21) Appl. No.: 14/007,696

(22) PCT Filed: Feb. 9, 2012

(86) PCT No.: PCT/EP2012/052206
§ 371 (c)(1),
(2), (4) Date: Nov. 27, 2013

(87) PCT Pub. No.: WO2012/130511
PCT Pub. Date: Oct. 4, 2012

(65) Prior Publication Data
US 2014/0070545 A1    Mar. 13, 2014

(30) Foreign Application Priority Data
Apr. 1, 2011 (DE) .......... 10 2011 006 641

(51) Int. Cl.
*H02P 9/00* (2006.01)
*B60W 10/06* (2006.01)
(Continued)

(52) U.S. Cl.
CPC .............. *H02P 9/00* (2013.01); *B60W 10/06* (2013.01); *B60W 10/30* (2013.01);
(Continued)

(58) Field of Classification Search
CPC ................ B60W 10/06; B60W 10/30; B60W 2710/305; B60W 30/18018;
(Continued)

(56) References Cited

U.S. PATENT DOCUMENTS 5,155,375 A * 10/1992 Holley .................. F03D 7/0224
290/44
5,512,812 A    4/1996 Ono
(Continued)

FOREIGN PATENT DOCUMENTS

DE    199 56 934    5/2001
DE    102 34 088    2/2004
(Continued)

OTHER PUBLICATIONS

"Start-Stopp-System—Verteilte Intelligenz Im Fahrzeug". In: ATZ extra—Audi A6, Jan. 2011, pp. 52-55.

*Primary Examiner* — Hieu T Vo
*Assistant Examiner* — Sherman Manley
(74) *Attorney, Agent, or Firm* — Norton Rose Fulbright US LLP; Gerard Messina

(57) ABSTRACT

A method for operating a generator for an internal combustion engine of a vehicle having a starting operating mode and a start-stop operating mode, a torque of the generator being delimited in the starting operating mode, including: detecting an operating mode of the vehicle, and deactivating a delimitation of the torque of the generator if the detected operating mode corresponds to the start-stop operating mode.

13 Claims, 2 Drawing Sheets

(51) Int. Cl.
*B60W 10/30* (2006.01)
*B60W 30/18* (2012.01)
*B60W 30/192* (2012.01)
*F02N 11/04* (2006.01)
*F02N 11/08* (2006.01)

(52) U.S. Cl.
CPC .... *B60W 30/18018* (2013.01); *B60W 30/192* (2013.01); *F02N 11/04* (2013.01); *B60W 2710/305* (2013.01); *F02N 11/084* (2013.01); *F02N 11/0825* (2013.01)

(58) Field of Classification Search
CPC ... B60W 30/192; F02N 11/04; F02N 11/0825; F02N 11/084; H02P 9/00
USPC .............. 290/40 R; 701/101, 22; 322/27, 28; 477/3; 123/179.3, 179.4, 339.16
See application file for complete search history.

(56) References Cited

U.S. PATENT DOCUMENTS

| | | | | |
|---|---|---|---|---|
| 5,836,151 A | * | 11/1998 | Atanasyan | F02D 41/06 123/179.3 |
| 6,429,627 B1 | * | 8/2002 | Koss | H02P 9/305 322/25 |
| 7,165,523 B1 | * | 1/2007 | Richard | F02N 11/006 123/179.3 |
| 7,531,992 B2 | * | 5/2009 | Inokuchi | H02P 9/107 322/24 |
| 8,890,492 B2 | * | 11/2014 | Ueno | F02D 29/06 290/40 B |
| 2002/0069639 A1 | * | 6/2002 | Gale | F01N 3/2013 60/284 |
| 2004/0153231 A1 | * | 8/2004 | Itoh | B60K 6/485 701/54 |
| 2007/0099749 A1 | * | 5/2007 | Zillmer | B60W 20/00 477/3 |
| 2010/0010723 A1 | * | 1/2010 | Taki | F02N 11/0837 701/102 |
| 2011/0271927 A1 | * | 11/2011 | Ueno | F02D 29/06 123/179.4 |

FOREIGN PATENT DOCUMENTS

| | | |
|---|---|---|
| DE | 102 34 089 | 2/2004 |
| DE | 103 13 215 | 10/2004 |
| DE | 10 2004 020730 | 11/2004 |
| DE | 600 19 274 | 3/2006 |
| DE | 10 2007 023946 | 5/2008 |
| JP | 070 46898 | 2/1995 |

* cited by examiner

METHOD AND DEVICE FOR OPERATING A GENERATOR

FIELD OF THE INVENTION

The present invention relates to a method and a device for operating a generator for an internal combustion engine of a vehicle.

BACKGROUND INFORMATION

It is understood that vehicles may have a start-stop system. Such a start-stop system is, in particular, a system for reducing fuel consumption of the vehicle which generally works automatically. Here, the system stops the internal combustion engine during a standing phase of the vehicle, e.g., during a stop at the traffic light. A driver's intent to continue driving is detected and the internal combustion engine is subsequently restarted. Usually, a power output of a generator and therefore the drive torque of the generator acting on the internal combustion engine is delimited during the starting operation of the internal combustion engine.

The disadvantage of this delimitation, which may also be referred to as damping, is, however, believed to be that considerable voltage drops may occur in the vehicle electrical system when electrical consumers are connected to the vehicle electrical system during the starting phase of the vehicle.

SUMMARY OF THE INVENTION

An object underlying the present invention may therefore be seen in that a method and a device are provided for operating a generator for an internal combustion engine of a vehicle which delimit or prevent voltage drops in the electrical system of the vehicle when electrical consumers are connected.

The object may be achieved by the particular subject matter described herein. Advantageous embodiments are the subject matter of the further descriptions herein.

According to one aspect, a method is provided for operating a generator for an internal combustion engine of a vehicle. Here, the vehicle may be operated in a starting operating mode and/or in a start-stop operating mode, a torque of the generator being delimited in the starting operating mode. An operating mode of the vehicle is detected and a delimitation of the torque of the generator is deactivated, if the detected operating mode corresponds to the start-stop operating mode.

According to another aspect, a device is provided for operating a generator for an internal combustion engine of a vehicle having a starting operating mode and a start-stop operating mode. Here, a torque of the generator is delimited in the starting operating mode. The device includes a detector for detecting an operating mode of the vehicle, a deactivation device being furthermore provided which is configured to deactivate a delimitation of the torque of the generator, if the detected operating mode corresponds to the start-stop operating mode.

It is thus advantageously made possible that in the start-stop operating mode, in which engine starts usually occur frequently, an unlimited torque of the generator is always available, so that voltage drops due to the connection of electrical consumers in the electrical system of the vehicle may be delimited/dampened or prevented. Frequent engine starts occur, for example, in traffic jams or in waiting lines in front of a red light when the vehicle is only able to drive for a short distance before it has to stop again. An unlimited torque in the sense of the present invention means, in particular, that the generator is able to make available its maximum electrical power to the vehicle electrical system. The torque received by the generator may also be referred to as a generator torque.

The starting operating mode includes in particular starting of the internal combustion engine and, in particular, starting of the vehicle. In the starting operating mode, the power output of the generator is delimited so that the drive torque of the generator acting on the internal combustion engine may be delimited.

In a start-stop operating mode, the internal combustion engine is in particular turned off/deactivated or switched off during a standing phase of the vehicle. The internal combustion engine is turned on again when a driver's intent to start the vehicle is detected. For example, an accelerator pedal position may be detected and the internal combustion engine may be restarted as a function of the detected position. For example, a clutch pedal position may also be detected and the internal combustion engine may be restarted as a function of the detected clutch pedal position. This therefore means that when the driver actuates the clutch pedal and/or the accelerator pedal, the internal combustion engine is restarted.

According to one specific embodiment, detecting the operating mode of the vehicle includes monitoring a communication between an internal combustion engine control unit and a generator controller. Here, the signals transmitted between the internal combustion engine control unit and the generator controller are detected in particular. Such signals are, in particular, control signals and/or diagnostic signals. Since the signals, which are transmitted from the internal combustion engine control unit to the generator controller and vice versa during the start-stop operating mode, usually differ from signals, which are transmitted from the internal combustion engine control unit to the generator controller and vice versa during a starting operating mode or during a driving operating mode, it may be advantageously recognized particularly easily that the vehicle is in the start-stop operating mode. The generator controller is in particular configured to control a power output of the generator and thus the torque picked up from the generator. The driving operating mode in particular occurs chronologically after the starting operating mode when the vehicle is able to drive continuously for a certain period of time or for a certain distance, without having to brake or stop again due to a red light or a traffic jam, for example. The internal combustion engine control unit is in particular configured to control the internal combustion engine and the generator controller and may therefore also be referred to as a superordinate control unit or engine control unit.

According to another specific embodiment, deactivating the delimitation of the torque of the generator is a function of a detected pulse-width-modulated signal, which is transmitted from the internal combustion engine to the generator controller, for controlling an operating mode of the generator controller. Since a pulse-width-modulated signal is in principle formed by two voltage levels (low and high level), a corresponding circuit of the generator controller may work in a low-loss circuit operation. The term "pulse-width-modulated" may also be abbreviated as PWM.

The pulse width modulation (PWM) is a type of modulation in which a technical variable, e.g., an electric current or an electrical voltage, varies between two values. In this case, the pulse duty factor of the signal, i.e., the width and not the breadth of a pulse, is modulated at a constant frequency.

According to another specific embodiment, detecting the combustion mode of the vehicle includes detecting an internal combustion engine operating mode. If, for example, it is detected that the internal combustion engine is switched off, it may in principle be excluded that the vehicle is in a starting operating mode. Thus, information regarding an operating mode of the vehicle is advantageously provided which may be used as reference when deciding whether to deactivate the delimitation of the torque of the generator.

In another specific embodiment, deactivating the delimitation of the torque of the generator includes deactivating a load-response function of the generator controller. Such a load-response function which may also be abbreviated as LRF may be implemented in or integrated into the generator controller. The load-response function may also be provided with the aid of a separate circuit which may be integrated into the generator controller, in particular. A load-response function in particular effectuates a running and/or exhaust gas behavior of the internal combustion engine being supported by a delimited increased rate of electrical power output of the generator over time. In particular, the load-response function effectuates that, when electrical consumers are connected, it is prevented in the electrical system of the vehicle that the braking torque, which acts retroactively on the internal combustion engine due to the power output increase of the generator, causes a torque drop or a stall of the internal combustion engine. A stall of the internal combustion engine in particular results in the internal combustion engine being shut down.

Such a load-response function may in particular be activated during the starting operation of the internal combustion engine. During the starting operation, the load-response function may also be referred to as the load-response start function (LRS function). During the driving operation or during a driving operating mode, the load-response function may also be activated and it may be referred to as an LRD function during this operating mode.

According to another specific embodiment, deactivating the delimitation of the torque of the generator includes using an alpha jump AS_SS for the starting operation.

According to another specific embodiment, deactivating the delimitation of the torque of the generator includes activating a stabilizing device of the vehicle electrical system. Such a stabilizing device of the vehicle electrical system in particular provides a stable electrical system function (SES function). The stabilizing device of the vehicle electrical system is in particular configured to compensate for voltage drops in the electrical system of the vehicle. A pulse duty factor of the pulse-width-modulated signal may be set to 100% in order to be able to advantageously compensate for the voltage drop.

According to another specific embodiment, detecting the operating mode of the vehicle includes detecting an operating mode of the generator controller. Such an operating mode may, for example, be a control operation, a standstill clocking, or a starting operation. The generator controller may also be in a standby mode or an active mode. Since the generator controller in principle passes through the operating modes control operation, standstill clocking, and starting operation in this order during the start-stop operation, it may be advantageously recognized that the vehicle is in the start-stop operating mode, whereupon the delimitation of the torque of the generator is deactivated.

According to another specific embodiment, the delimitation of the torque of the generator is additionally deactivated as a function of a detected temperature of the generator. Since the likelihood of the torque of the generator resulting in a stall of the internal combustion engine is in particular a function of the temperature of the generator, such a stall may thus be advantageously prevented. In particular, the likelihood decreases at higher temperatures, whereas it increases at lower temperatures. Therefore, the deactivation of the damping or delimitation of the torque of the generator need not be released until the generator is sufficiently hot. For this purpose, a temperature may also be evaluated in the generator controller. Only when the generator controller temperature exceeds a certain threshold value is the damping or delimitation of the torque of the generator which may be deactivated.

According to another specific embodiment, the deactivation device is integrated into the generator controller. Thus, a particularly compact configuration of the device according to the present invention may be achieved due to the integration.

According to another specific embodiment, the detector is configured to monitor a communication between the internal combustion engine control unit and the generator controller.

According to another specific embodiment, the detector has a temperature sensor for detecting a generator temperature. The deactivation device may be also configured to deactivate the delimitation of the torque of the generator as a function of the detected temperature. Multiple temperature sensors may also be provided. The temperature sensor(s) may also be configured to detect a generator controller temperature, the deactivation device then being configured in particular to deactivate the delimitation of the torque of the generator as a function of this detected temperature.

According to one aspect, a system is provided including a device for operating a generator for an internal combustion engine, an internal combustion engine control unit, and a generator controller.

The present invention is described in greater detail in the following on the basis of the exemplary embodiments with reference to the drawings.

DETAILED DESCRIPTION

Figure 1:
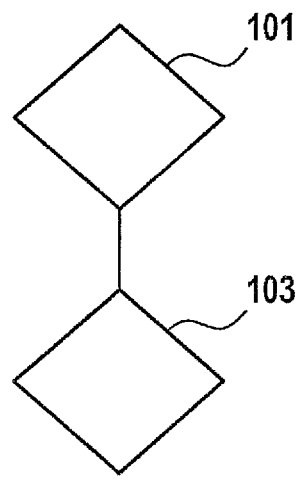
FIG. 1 shows a schematic flow chart of a method for operating a generator for an internal combustion engine of a vehicle.

The same reference numerals are used below for the same features.

FIG. 1 shows a flow chart of one specific embodiment of a method for operating a generator for an internal combustion engine of a vehicle. In a step 101, an operating mode of the vehicle is detected. In a subsequent step 103, a delimitation of the torque of the generator is deactivated if the operating mode detected in step 101 corresponds to the start-stop operating mode.

Figure 2:
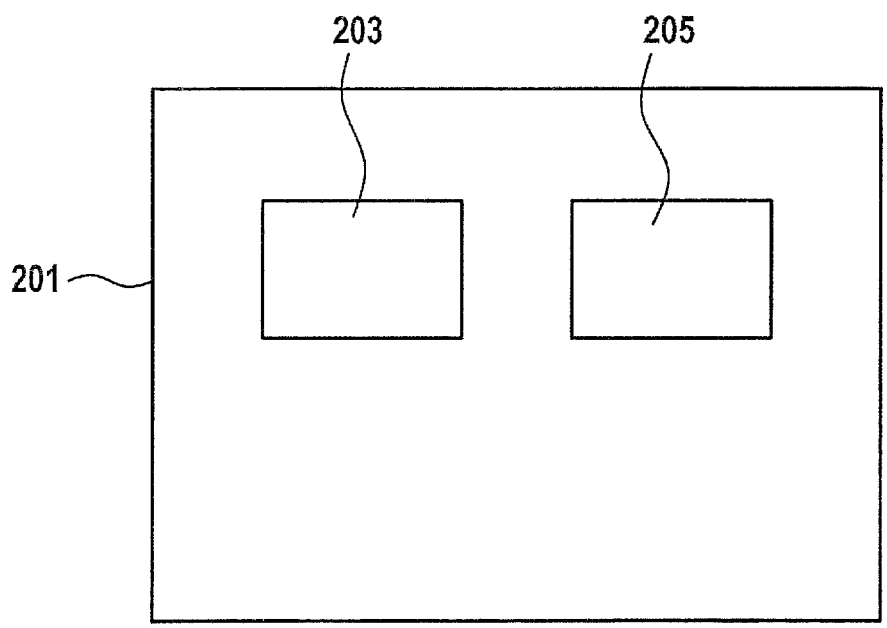
FIG. 2 shows a device for operating a generator for an internal combustion engine of a vehicle.

FIG. 2 shows a device 201 for operating a generator (not illustrated) for an internal combustion engine (not illustrated) of a vehicle (not illustrated). The vehicle has a starting operating mode and/or a start-stop operating mode, a torque of the generator being delimited in the starting operating mode. Device 201 furthermore includes a detector 203 for detecting an operating mode of the vehicle. Furthermore, device 201 includes a deactivation device 205 which is configured to deactivate a delimitation of the torque of the generator if the detected operating mode corresponds to the start-stop operating mode.

Figure 3:
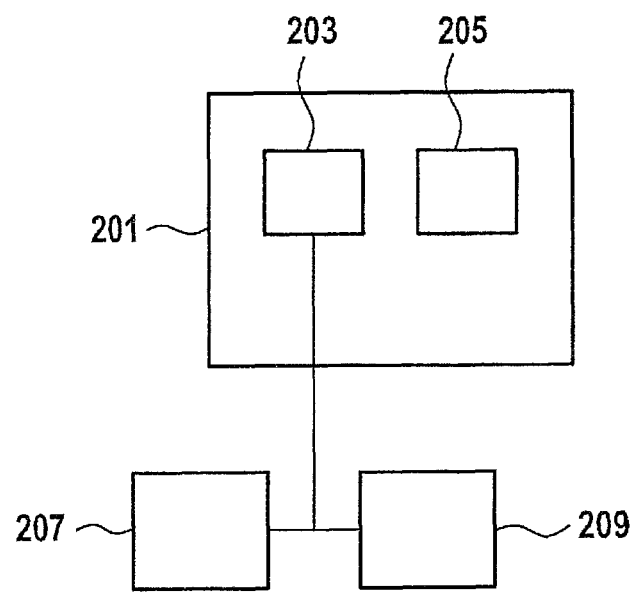
FIG. 3 shows the device from FIG. 2 during the monitoring of a communication between an internal combustion engine control unit and a generator controller.

FIG. 3 schematically shows device 201 from FIG. 2, detector 203 monitoring a communication between an internal combustion engine control unit 207 and a generator controller 209. For example, internal combustion engine control unit 207 may transmit a pulse-width-modulated signal to generator controller 209 for controlling an operating mode of generator controller 209. This pulse-width-modulated signal is detected by detector 203, and the delimitation of the torque of the generator is then deactivated as a function of the detected signal.

Figure 4:
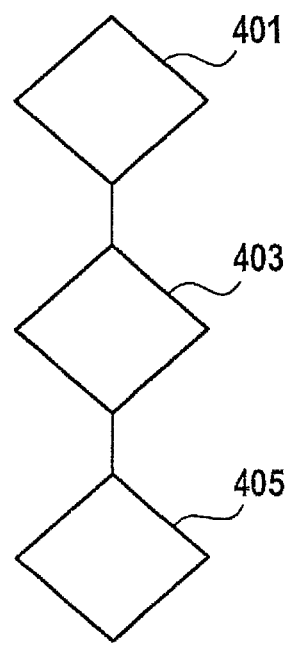
FIG. 4 shows a flow chart of another method for operating a generator for an internal combustion engine of a vehicle.

FIG. 4 shows a flow chart of another specific embodiment of a method for operating a generator for an internal combustion engine of a vehicle. In a step 401, a communication is monitored between an internal combustion engine control unit and a generator controller. In a step 403, a temperature is detected in the generator. In a step 405, a delimitation of the torque of the generator is deactivated as a function of the communication between the internal combustion engine control unit and the generator, e.g., as a function of the detected transmitted signals and the detected generator temperature.

According to a not illustrated specific embodiment, a delimitation of the torque of the generator is deactivated or else activated when the generator controller recognizes that the vehicle is in a start-stop operating mode. This recognition is in particular a function of how the internal combustion engine control unit communicates with the generator controller during the start-stop operating mode. The internal combustion engine control unit may in general shift the generator controller into a standby mode or keep it in an active mode, which will be explained in greater detail in the following.

The generator controller is shifted into the standby mode:

The generator controller is shifted into the standby mode as soon as the stop phase of the start-stop operating mode is initiated. Now, to be able to recognize a start-stop operating mode, the engine control unit must activate the generator controller by transmitting a certain predefined PWM setpoint value. Here, PWM refers to pulse width modulation. This means that the internal combustion engine control unit transmits a pulse-width-modulated signal to the generator controller.

The generator controller is kept in active mode:

During the stop phase of the start-stop operating mode, the internal combustion engine control unit continues to transmit valid predefined PWM setpoint values. This means that the internal combustion engine control unit transmits a corresponding pulse-width-modulated signal to the generator controller, so that the generator controller remains in active mode. However, since during the stop phase the internal combustion engine is turned off, the generator controller recognizes the operating mode "standstill" and transitions into the operating mode "standstill clocking." This is recognized by the generator controller as a stop phase in the start-stop operating mode and thus as a start-stop operating mode.

In another not illustrated specific embodiment, a damping or delimitation of the torque of the generator may be deactivated by deactivating an LRS function. The LRS function corresponds to the load-response function during the starting operation of the internal combustion engine. In this case, the change rate of the pulse duty factor of the pulse-width modulated signal is not delimited in particular during the starting operation, and the generator may put a strain on a drive train using maximum power and maximum torque, i.e., make the maximum electrical power available to the vehicle electrical system.

In another not illustrated specific embodiment, a damping or delimitation of the torque of the generator may be deactivated by setting the level of the abrupt change of the pulse duty factor of the pulse-width-modulated signal (so-called alpha jump) to a high value (e.g., 60%). In this case, the LRS function is still active. Thus, a sufficiently high electrical power is made available to the vehicle electrical system, if needed.

In another not illustrated specific embodiment, the damping or delimitation of the torque of the generator may be deactivated in that a stabilizing device of the vehicle electrical system is activated during the starting operation. Usually, such a stabilizing device of the vehicle electrical system is deactivated during the starting operation. It is only activated during normal operation, i.e., during normal vehicle operation, and intervenes in case of significant voltage drops in a superordinate manner by setting the pulse duty factor to 100% in order to compensate for the voltage drop. In this case, the LRS function may be still active. If, however, a large electrical load, which results in a drop in the vehicle electrical system voltage, is connected during the starting operation, the SES function, which is provided with the aid of the stabilizing device of the vehicle electrical system, intervenes and compensates for this drop. The advantage of the intervention via the SES function is in particular that the generator torque or the torque of the generator is dynamically applied to the drive train only as needed, e.g., in the case of a voltage drop. If there is no voltage drop, the torque of the generator is damped or delimited by the LRS function.

Furthermore, in another not illustrated specific embodiment, the deactivation of the damping of the generator torque is not released until the generator is hot. If the generator is cold, the generator torque may result in stalling of the internal combustion engine. This may help to advantageously prevent such an engine stall. This may take place in that a temperature is detected and evaluated in the generator and/or in the generator controller. Only when the corresponding temperature exceeds a certain threshold value is the damping or delimitation of the generator torque deactivated.

In another not illustrated specific embodiment, the generator controller is shifted into a standby mode during the stop phase of the start-stop operating mode. The LRS function is in particular deactivated. If the generator controller is activated via a certain predefined PWM setpoint value (U_PWM), the generator controller recognizes the start-stop operating mode. If the temperature of the generator controller exceeds a certain threshold value, the LRS function for the starting operation may be deactivated. The generator controller then may control the temperature to a predetermined standard setpoint value until a predefined value is received which deviates from U_PWM.

In another not illustrated specific embodiment, the generator controller is shifted into a standby mode during the stop phase of the start-stop operating mode. Alpha jump AS_SS is in particular set to a predetermined high value. If the generator controller is activated via a certain predefined PWM setpoint value (U_PWM), the generator controller recognizes the start-stop operating mode. If the temperature of the generator controller exceeds a certain threshold value, alpha jump AS_SS which is predetermined for the starting operation may be applied. The generator controller then may control the temperature to a predetermined standard setpoint value until a predefined value is received which deviates from U_PWM. The LRS function is activated in this case.

In another not illustrated specific embodiment, the generator controller is shifted into a standby mode during the stop phase, and the stable electrical system function is activated at the start, i.e., the stabilizing device of the vehicle electrical system is activated during the starting operation. If the controller is activated via a certain predefined PWM setpoint value U_PWM, the generator controller recognizes the start-stop operating mode. If the temperature of the generator controller exceeds a certain threshold value, the SES function is activated for the starting operation. The generator controller controls the temperature to the predetermined standard setpoint value until a predefined value is received which deviates from U_PWM. After reaching normal operation, the SES function for the start is deactivated again.

In yet another not illustrated specific embodiment, the generator controller is kept in an active mode during the stop phase, and the LRS function may be deactivated. If the generator controller passes through the operating modes normal operation, standstill clocking, and starting operation in this order, the generator controller recognizes the start-stop operating mode. If the temperature of the generator controller exceeds a certain threshold value, the LRS function for the starting operation is deactivated. The generator controller controls the temperature in particular to the predefined PWM setpoint value.

In another not illustrated specific embodiment, the generator controller is kept in an active mode during the stop phase, and alpha jump AS_SS may be applied. If the generator controller passes through the operating modes normal operation, standstill clocking, and starting operation in this order, the generator controller recognizes the start-stop operating mode. If the temperature of the generator controller exceeds a certain threshold value, AS_SS is applied for the starting operation. The generator controller controls the temperature in particular to the predefined PWM setpoint value.

In yet another specific embodiment, the generator controller is kept in an active mode during the stop phase of the start-stop operating mode, and the stable electrical system function (SES function) may be activated at the start. If the generator controller in particular passes through the modes normal operation, standstill clocking, and starting operation in this order, the generator controller recognizes the start-stop operating mode. If the temperature of the generator controller exceeds a certain threshold value, the SES function for the starting operation is activated. The generator controller then in particular controls the temperature to the predefined PWM setpoint value. After reaching normal operation, the SES function for the start may be deactivated again.

In summary, the present invention provides a method and a device which in particular make it possible to deactivate a damping or delimitation of the generator torque as a function of the surrounding conditions and in particular of the predefined PWM setpoint values. Thus, the full power or an unlimited generator torque is available even during a starting operation, so that potential voltage drops in the vehicle electrical system may be advantageously dampened.

What is claimed is:

1. A method for operating a generator for an internal combustion engine of a vehicle having a starting operating mode and a start-stop operating mode, wherein a torque of the generator is limited in the starting operating mode, the method comprising:
   detecting an operating mode of the vehicle; and
   preventing the limitation of the torque of the generator if the detected operating mode corresponds to the start-stop operating mode.

2. The method of claim 1, wherein the detecting includes monitoring a communication between an internal combustion engine control unit and a generator controller.

3. The method of claim 2, wherein the preventing of the limitation of the torque of the generator is a function of a detected pulse-width-modulated signal, which is transmitted from the internal combustion engine control unit to the generator controller, for controlling an operating mode of the generator controller.

4. The method of claim 1, wherein the detecting of the operating mode of the vehicle includes detecting an internal combustion engine operating mode.

5. The method of claim 1, wherein the preventing of the limitation of the torque of the generator includes preventing a load-response function of the internal combustion engine control unit.

6. The method of claim 1, wherein the preventing of the limitation of the torque of the generator includes the use of an alpha jump for the starting operation.

7. The method of claim 1, wherein the preventing of the limitation of the torque of the generator includes activating a stabilizing device of the vehicle electrical system.

8. The method of claim 1, wherein the detecting of the operating mode of the vehicle includes detecting an operating mode of the generator controller.

9. The method of claim 1, wherein the limitation of the torque of the generator is additionally prevented as a function of a detected temperature of the generator.

10. A device for operating a generator for an internal combustion engine of a vehicle having a starting operating mode and a start-stop operating mode, wherein a torque of the generator is limited in the starting operating mode, comprising:
    a detector to detect an operating mode of the vehicle; and
    a prevention device to prevent the limitation of the torque of the generator if the detected operating mode corresponds to the start-stop operating mode.

11. The device of claim 10, wherein the prevention device is integrated into a generator controller.

12. The device of claim 10, wherein the detector is configured to monitor a communication between an internal combustion engine control unit and the generator controller.

13. The device of claim 10, wherein the detector has a temperature sensor for detecting a generator temperature, and the prevention device is also formed to prevent the limitation of the torque of the generator as a function of the detected temperature.

* * * * *